United States Patent
Anantharaman Chandrasekarapuram et al.

(10) Patent No.: US 10,187,096 B2
(45) Date of Patent: Jan. 22, 2019

(54) OUTDOOR UNIT RESONATOR CORRECTION

(71) Applicant: Maxlinear, Inc., Carlsbad, CA (US)

(72) Inventors: Subramanian Anantharaman Chandrasekarapuram, Bangalore (IN); Anand Anandakumar, San Diego, CA (US); Stephane Laurent-Michel, Carlsbad, CA (US); Sheng Ye, Carlsbad, CA (US); Raja Pullela, Irvine, CA (US); Glenn Chang, Carlsbad, CA (US); Vamsi Paidi, Irvine, CA (US)

(73) Assignee: Maxlinear, Inc., Carlsbad, CA (US)

( * ) Notice: Subject to any disclaimer, the term of this patent is extended or adjusted under 35 U.S.C. 154(b) by 0 days.

(21) Appl. No.: 15/609,946

(22) Filed: May 31, 2017

(65) Prior Publication Data
US 2017/0264325 A1 Sep. 14, 2017

Related U.S. Application Data

(63) Continuation of application No. 14/976,529, filed on Dec. 21, 2015, now Pat. No. 9,685,983, which is a (Continued)

(30) Foreign Application Priority Data

Nov. 5, 2015 (IN) .......................... 3615/DEL/2015

(51) Int. Cl.
*H04L 7/00* (2006.01)
*H04B 1/10* (2006.01)

(52) U.S. Cl.
CPC ................................. *H04B 1/1027* (2013.01)

(58) Field of Classification Search
CPC ..... H04L 7/033; H04L 7/0337; H04L 7/0338; H04L 7/0008; H04L 7/02; H04L 7/0331;
(Continued)

(56) References Cited

U.S. PATENT DOCUMENTS 3,653,047 A * 3/1972 Anthony ................... G01S 1/50
342/401
4,426,735 A * 1/1984 Kasperkovitz ........... H03G 3/34
455/208

(Continued)

*Primary Examiner* — Zewdu Kassa
(74) *Attorney, Agent, or Firm* — McAndrews, Held & Malloy, Ltd.

(57) ABSTRACT

A system comprises a microwave backhaul outdoor unit having a first resonant circuit, phase error determination circuitry, and phase error compensation circuitry. The first resonant circuit is operable to generate a first signal characterized by a first amount of phase noise and a first amount of temperature stability. The phase error determination circuitry is operable to generate a phase error signal indicative of phase error between the first signal and a second signal, wherein the second signal is characterized by a second amount of phase noise that is greater than the first amount of phase noise, and the second signal is characterized by a second amount of temperature instability that is less than the first amount of temperature instability. The phase error compensation circuitry is operable to adjust the phase of a data signal based on the phase error signal, the adjustment resulting in a phase compensated signal.

20 Claims, 12 Drawing Sheets

Related U.S. Application Data continuation-in-part of application No. 14/929,465, filed on Nov. 2, 2015.

(60) Provisional application No. 62/075,297, filed on Nov. 5, 2014.

(58) Field of Classification Search
CPC ... H04L 1/0003; H04L 1/0071; H04L 5/0007; H04L 1/0009; H04L 27/0008; H04L 27/2647; H03L 7/0814; G06F 1/10; H04N 5/4401
USPC .......................... 375/371, 354, 295, 316, 219
See application file for complete search history.

(56) References Cited

U.S. PATENT DOCUMENTS

2002/0196864 A1* 12/2002 Booth ................... H03F 1/3294
375/296
2005/0239428 A1* 10/2005 Seendripu .............. H03D 3/009
455/280

* cited by examiner

OUTDOOR UNIT RESONATOR CORRECTION

PRIORITY CLAIM

This application is a continuation of U.S. patent application Ser. No. 14/976,529 filed on Dec. 21, 2015, which is a continuation-in-part of U.S. patent application Ser. No. 14/929,465 filed on Nov. 2, 2015, now Abandoned which claims priority to U.S. provisional patent application 62/075,297 filed on Nov. 5, 2014. This application also claim priority to Indian provisional patent application 3615/DEL/2015 filed on Nov. 56, 2015. Each of the above referenced documents is hereby incorporated herein by reference in its entirety.

BACKGROUND

Limitations and disadvantages of conventional methods and systems for microwave backhaul will become apparent to one of skill in the art, through comparison of such systems with some aspects of the present invention as set forth in the remainder of the present application with reference to the drawings.

BRIEF SUMMARY OF THE INVENTION

Systems and methods are provided for low phase noise microwave backhaul communications, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

As used herein, "microwave" frequencies range from approximately 300 MHz to 300 GHz and "millimeter wave" frequencies range from approximately 30 GHz to 300 GHz. Thus, the "microwave" band includes the "millimeter wave" band.

Figure 1A:
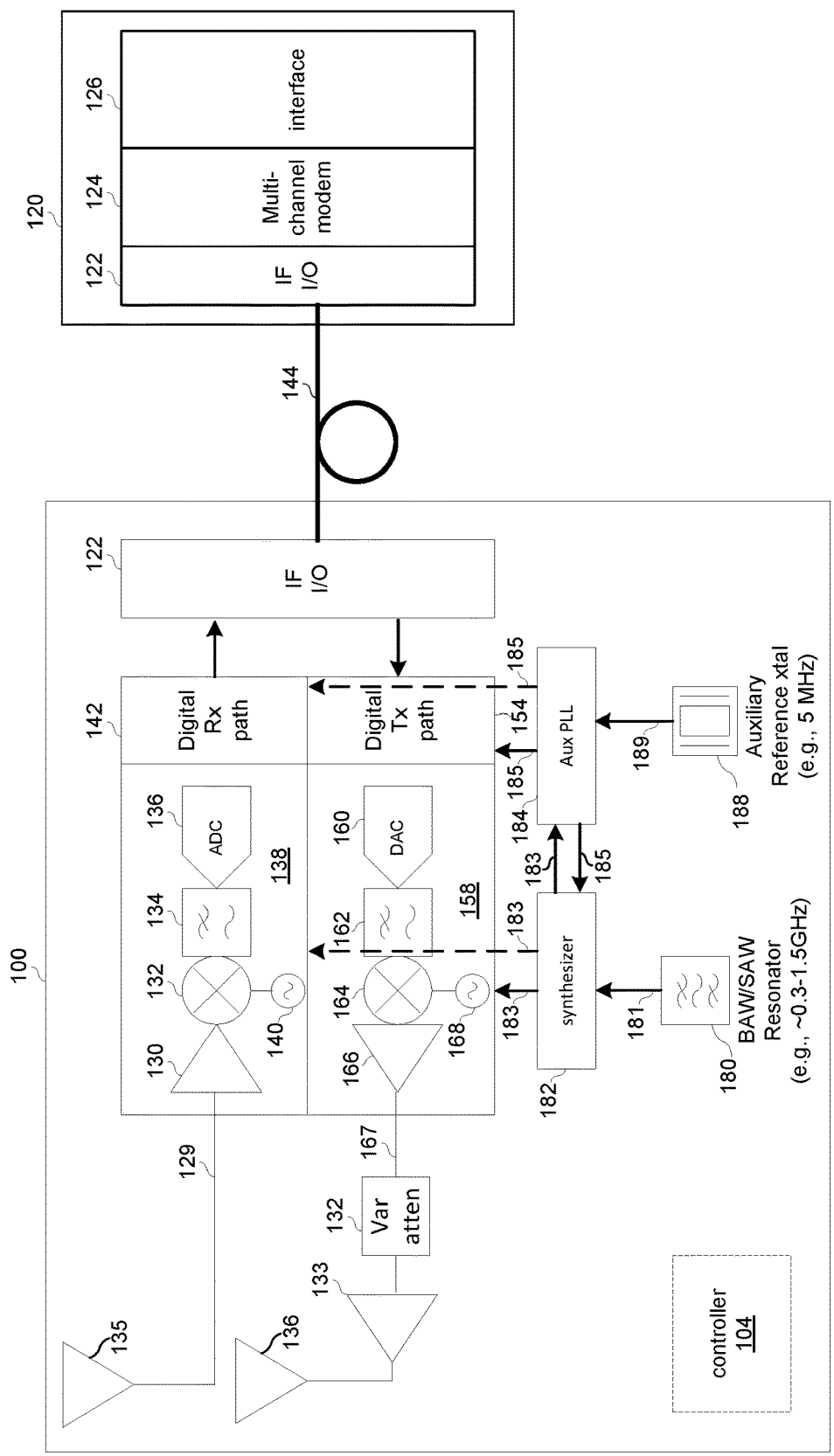
FIG. 1A shows an example split-architecture microwave backhaul transceiver, in accordance with aspects of this disclosure.

FIG. 1A shows an example split-architecture microwave backhaul transceiver, in accordance with aspects of this disclosure. The example microwave backhaul transceiver is split into an outdoor unit 100 and an indoor unit 120.

The indoor unit 120 comprises an instance of intermediate frequency (IF) input and/or output interface 122, a multi-channel modulator and/or demodulator (modem) 124, and an interface 126 (e.g., a serialization and/or deserialization circuit, gigabit Ethernet interface, and/or the like).

The outdoor unit 100 comprises antennas 135 and 136 (in another example implementation a single antenna may be shared through use of a diplexer), amplifier 133, a variable attenuator 132, receive analog front-end circuit (AFE) 138, a digital receive path circuit 142, a transmit AFE 158, a digital transmit path circuit 154, an instance of IF input and/or output interface 122 (called out as 122a) a, a local oscillator (LO) synthesizer 182, and an auxiliary phase locked loop (PLL) 184. Also shown is a controller 104 (e.g., a state machine, a programmable interrupt controller, an ARM-based processor, or the like) which may be on-chip with the transceiver or may be on a separate chip in the ODU.

In an example implementation, the amplifier 133 and attenuator 132 may be implemented on a GaAs die and the AFEs 138, 158 and digital circuitry 142 and 154 may be implemented on a CMOS die. In another example implementation, the amplifier 133 and attenuator 132 may be unnecessary and the microwave transceiver 100 may be entirely CMOS, for example.

The receive AFE 138 comprises an amplifier 130, a mixer 132, a filter 134, an analog-to-digital converter 136, and frequency synthesizer 140. The transmit AFE 158 comprises amplifier 166, mixer 164, filter 162, a digital-to-analog converter 160, and a frequency synthesizer 168.

For receive, the SAW or BAW-based oscillator signal 183 output by synthesizer 182 is fed to frequency synthesizer 140 which generates the LO signal used by the mixer 132. The SAW or BAW-based oscillator signal 183 is also fed to the auxiliary PLL 184 for generation of the error signal 185. The received microwave signal 129 is amplified by amplifier 130 and downconverted to baseband by mixer 132. The baseband signal is then filtered by filter 134 and digitized by ADC 136. The digitized baseband signal is then provided to the digital receive circuitry 142, where its phase is corrected based on error signal 185 before being passed to interface 122a. Interface 122a upconverts the baseband signal to an IF signal which may comprise one or more channels selected by digital receive circuitry 142, where the upconversion may include performing channel stacking where more than one channel is selected. The interface 122b receives the IF signal carrying the channel(s), the modem 124 demodulates the channel(s), and the interface 126 processes (e.g., serializes, encapsulates, and/or the like) the demodulated data for transmission to a destination of the data (e.g., a cellular basestation).

For transmit, the interface 126 processes (e.g., deserializes, decapsulates, and/or the like) data received from a source (e.g., cellular basestation) and passes the data to the modem 124 which modulates the data onto one or more channels. The modulated channel(s) is(are) then upconverted to IF by interface 122b and sent over the link 144 to the outdoor unit 100. In the outdoor unit 100, the SAW or BAW-based oscillator signal 183 output by synthesizer 182 is fed to frequency synthesizer 168 which generates the LO signal used by the mixer 164. The SAW or BAW-based oscillator signal 183 is also fed to the auxiliary PLL 184 for generation of the error signal 185. In the digital transmit circuitry 154, the phase of the baseband signal from the interface 122a is corrected (e.g., pre or post compensated) based on the error signal 185. The phase-compensated signal is then converted to analog by DAC 160, filtered by filter 162, upconverted by mixer 164, and amplified by amplifier 166 resulting in transmitted signal 167.

In FIG. 1A, the error signal 185 is generated by the auxiliary PLL 184 using the XTAL-based oscillator signal 189. Example details of this are described below with reference to FIGS. 5A-5C. The error signal 185 is also provided to the synthesizer 182 for tuning the frequency of the SAW or BAW-based oscillator signal 183 (e.g., to compensate for drift due to temperature change).

Figure 1B:
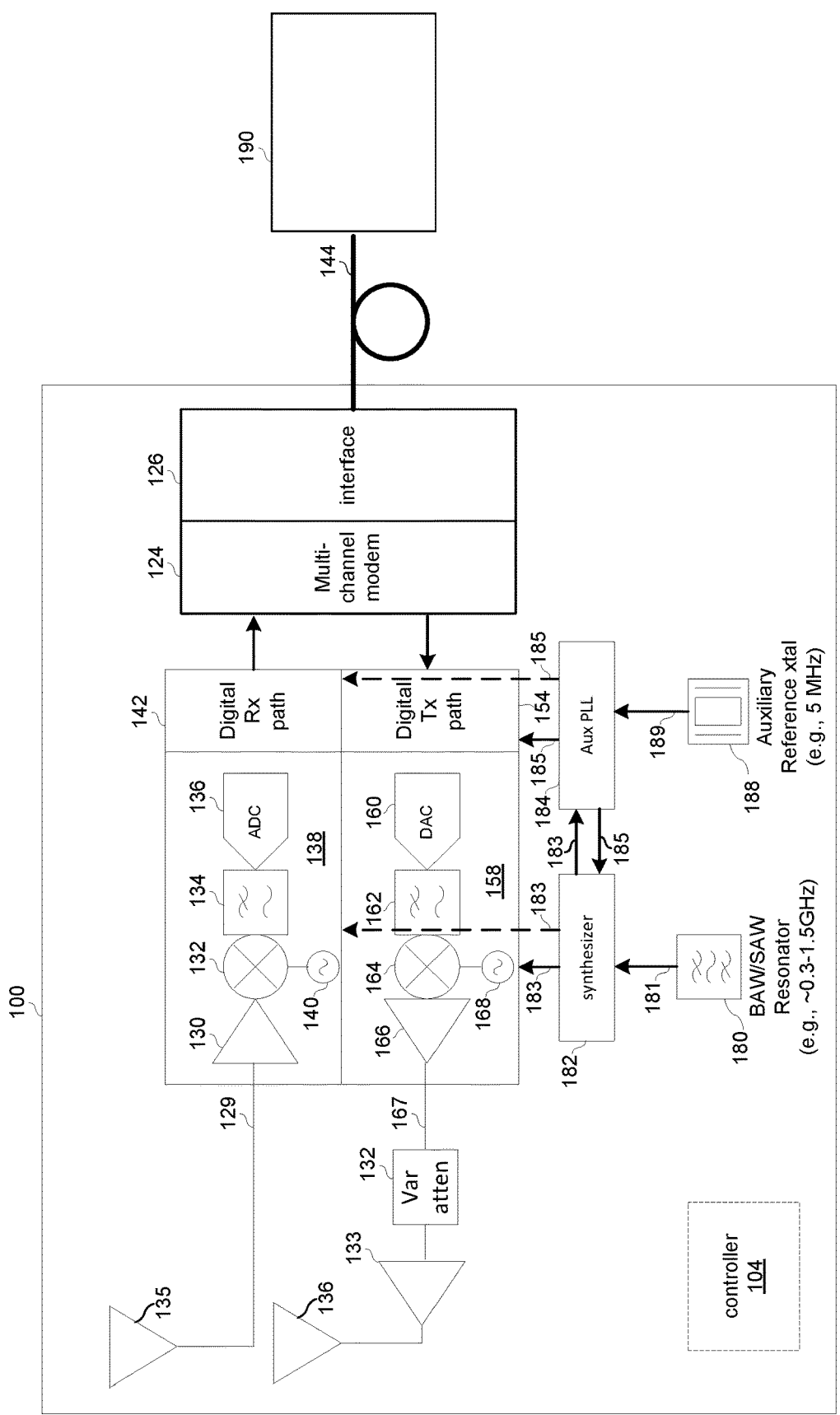
FIG. 1B shows an example all-outdoor microwave backhaul transceiver, in accordance with aspects of this disclosure.

FIG. 1B shows an example all-outdoor microwave backhaul transceiver, in accordance with aspects of this disclosure. The implementation of FIG. 1B is similar to the implementation of FIG. 1A with the difference being that modem 124 and interface 126 are integrated (e.g., in the same housing, on the same printed circuit board, on the same semiconductor die, and/or otherwise) with the outdoor unit 100. The link 144 then provides connectivity to an external device 190 (e.g., another outdoor unit, an indoor unit, or other electronic device).

Figure 2A:
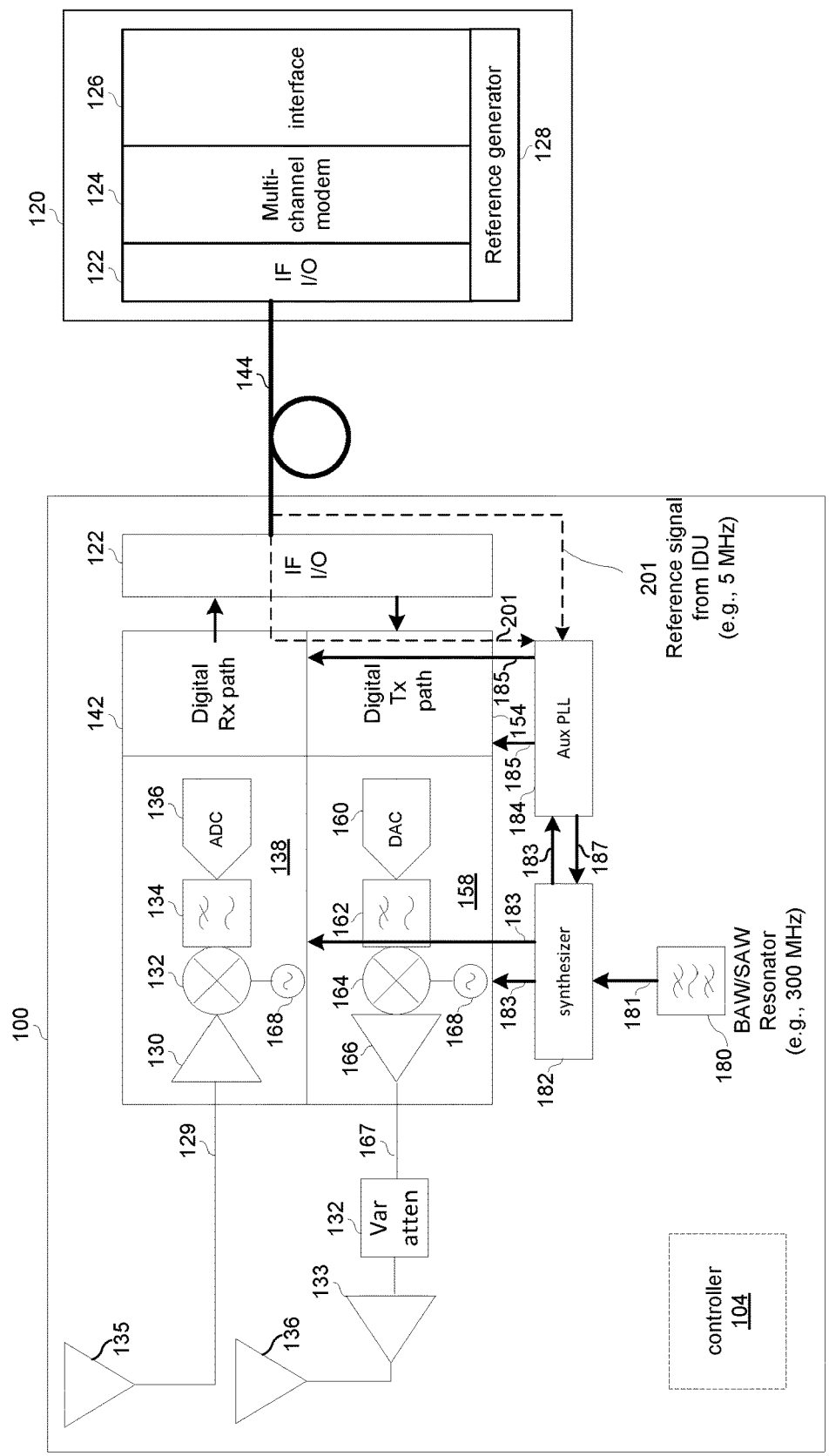
FIG. 2A shows an example split-architecture microwave backhaul transceiver, in accordance with aspects of this disclosure.

FIG. 2A shows an example split-architecture microwave backhaul transceiver, in accordance with aspects of this disclosure. FIG. 2A is substantially the same as FIG. 1A, except the auxiliary PLL 184 receives a reference signal 201 from the reference generator 128 of the indoor unit 120, rather than reference signal 189 from the crystal 188 shown in FIG. 1A. The reference signal 201 may, for example, be an analog tone picked off of the link 144 by an analog band select filter. The reference signal 201 may, for example, be digitized and then selected by interface 122a for conveyance to the auxiliary PLL 184.

Figure 2B:
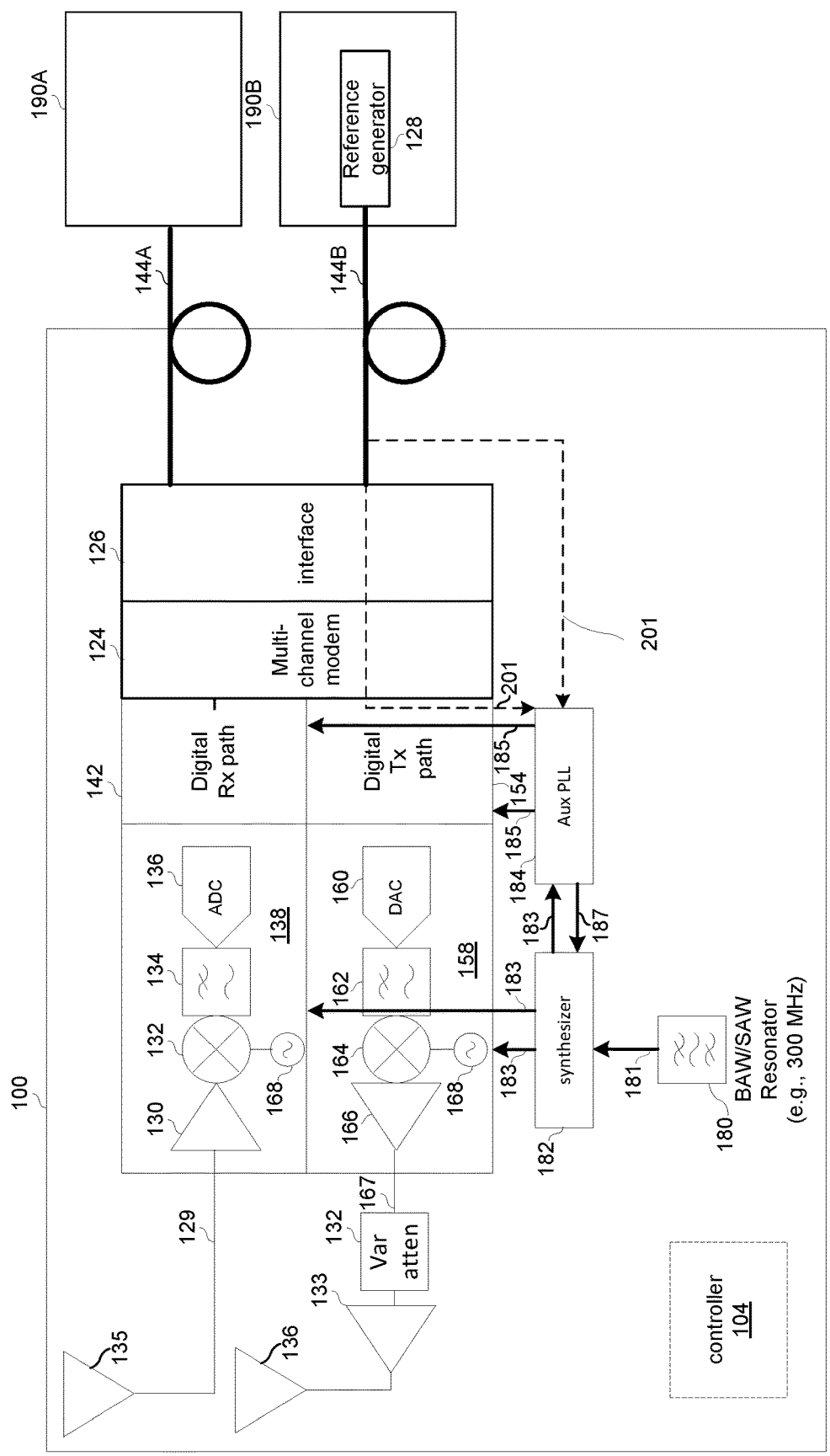
FIG. 2B shows an example all-outdoor microwave backhaul transceiver, in accordance with aspects of this disclosure.

FIG. 2B shows an example all-outdoor microwave backhaul transceiver, in accordance with aspects of this disclosure. The implementation of FIG. 2B is similar to the implementation of FIG. 2A. One difference in FIG. 2A is that modem 124 and interface 126 are integrated (e.g., in the same housing, on the same printed circuit board, on the same semiconductor die, and/or otherwise) with the outdoor unit 100. Another difference is that there are two links 144A and 144B connecting the outdoor unit 100 to external device(s). The outdoor unit 100 may, for example, send and/or receive data to and/or from a first external device 190A (e.g., another outdoor unit, an indoor unit, or other device) via the cable 144A. The outdoor unit 100 may, for example, receive reference signal 201 via link 144B data to and/or from a second external device 190B (e.g., another outdoor unit, an indoor unit, or other device). Where 190A is another outdoor unit, it may be a split-architecture or all-outdoor architecture. When data and reference signal come from the same external devise, the two links 144A and 144B can use different physical medium or the same physical medium.

Figure 2C:
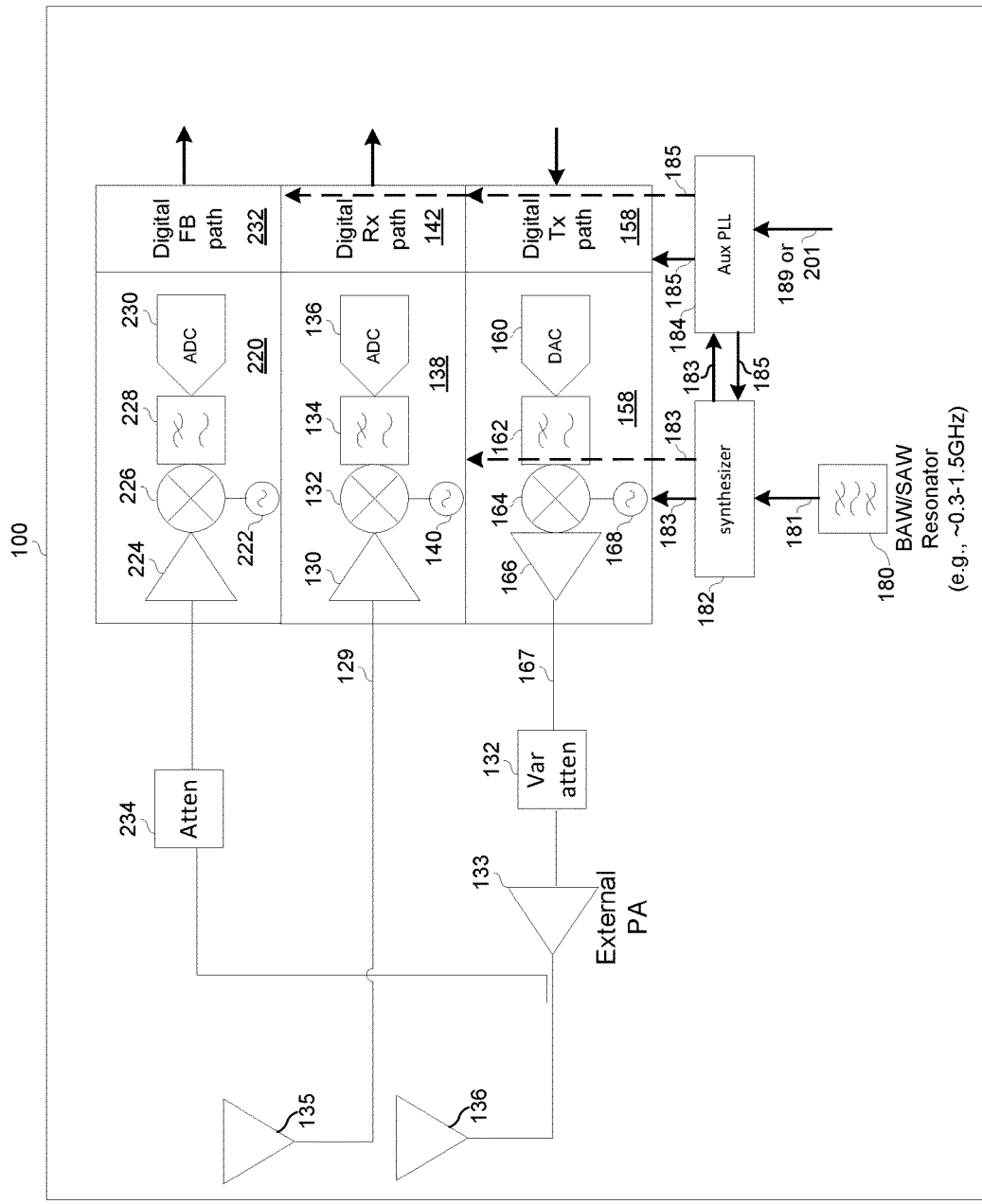
FIG. 2C shows a portion of an example microwave backhaul receiver comprising a feedback path, in accordance with aspects of this disclosure.

FIG. 2C shows a portion of an example microwave backhaul receiver comprising a feedback path. The depicted portion of the microwave transceiver 100 is similar to those described above but additionally comprises a feedback receive path comprising attenuator 234, AFE 220, and digital portion 232. Portions of microwave transceiver 100 not shown in FIG. 2C may be as shown in any of FIGS. 1A, 1B, 2A, and 2B.

In operation, the output of amplifier 133 is coupled to the attenuator 234 which reduces it to levels suitable for input to AFE 220 (e.g., which may be CMOS, for example). The sensed signal is processed by AFE 220 similar to how the AFE 138 process the received signal 129. The digital feedback circuitry 232 the processes the feedback signal to compare it to the transmitted signal, which it may receive from the digital transmit circuitry 158.

In an example implementation, the digital feedback circuitry 232 may compare the feedback signal to the corrected signal 409 (FIG. 4) to ensure they have the same frequency offset. If not, then actions may be performed such as triggering a recalibration of frequency offset correction circuitry (see e.g., FIG. 6, below), generating an error flag, and/or the like. If the frequency offset is the same for the two signals, then the phase offset between the two signals is estimated and corrected. The phase offset should be fixed since phase noise is the same for the transmit and feedback paths. Then, a least square estimation algorithm is performed on the feedback signal to determine digital predistortion coefficients to be used in the digital transmit circuitry 154.

In another example implementation, the digital feedback circuitry 232 may undo the correction to the feedback signal (i.e., remove the phase correction that was applied by digital transmit path 158) and then compare the feedback signal to the uncorrected signal 419 (FIG. 4) to ensure they have the same frequency offset. If not, then actions may be performed such as triggering a recalibration of frequency offset correction circuitry (see e.g., FIG. 6, below), generating an error flag, and/or the like. If the frequency offset is the same for the two signals, then the phase offset between the two signals is estimated and corrected. The phase offset should be fixed since phase noise is the same for the transmit and feedback paths. Then, a least square estimation algorithm is performed on the feedback signal to determine digital predistortion coefficients to be used in the digital transmit circuitry 154.

Figure 3A:
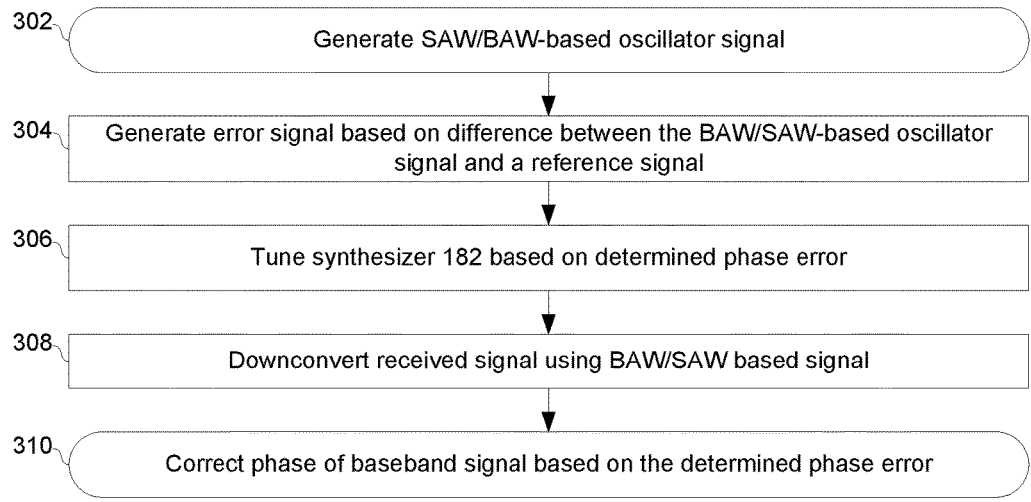
FIG. 3A is a flowchart illustrating an example process for low-phase-noise reception by a microwave backhaul transceiver.

FIG. 3A is a flowchart illustrating an example process for low-phase-noise reception by a microwave backhaul transceiver.

The process begins with block 302 in which SAW or BAW-based oscillator signal 183 is generated by synthesizer 182 based on the output 181 of resonator 180 which may be a bulk acoustic wave (BAW) or surface acoustic wave (SAW) resonator. An advantage of generating the signal 183 from a BAW or SAW resonator is that BAW or SAW resonators are typically able to achieve much lower phase noise at much higher frequencies than crystal oscillators. A drawback of using a BAW or SAW resonator, however, is that they tend to have a high temperature coefficient (i.e., resonant frequency varies substantially over expected range of operating temperature). Accordingly, aspects of this disclosure provide for compensating for phase and/or frequency drift of the SAW OR BAW resonator 180.

In block 304, error signal 185 is generated based on the phase difference between the SAW OR BAW-based oscillator signal 183 and a reference signal (e.g., reference signal 189 in FIG. 1A and FIG. 1B or reference signal 201 in FIG. 2A and FIG. 2B). Example circuitry for generating the error signal is described below with reference to FIGS. 5A-5C.

In block 306, the synthesizer 182 tunes the frequency of the SAW OR BAW-based oscillator signal 183 based on the error signal 185 generated in block 304.

In block 308, the received signal is downconverted to baseband using the BAW or SAW-based oscillator signal 183.

In block 310, the digital receive circuitry 142 corrects the phase of the baseband signal using the error signal 185 generated in block 304. Example circuitry for performing that phase correction is described below with reference to FIG. 4.

Figure 3B:
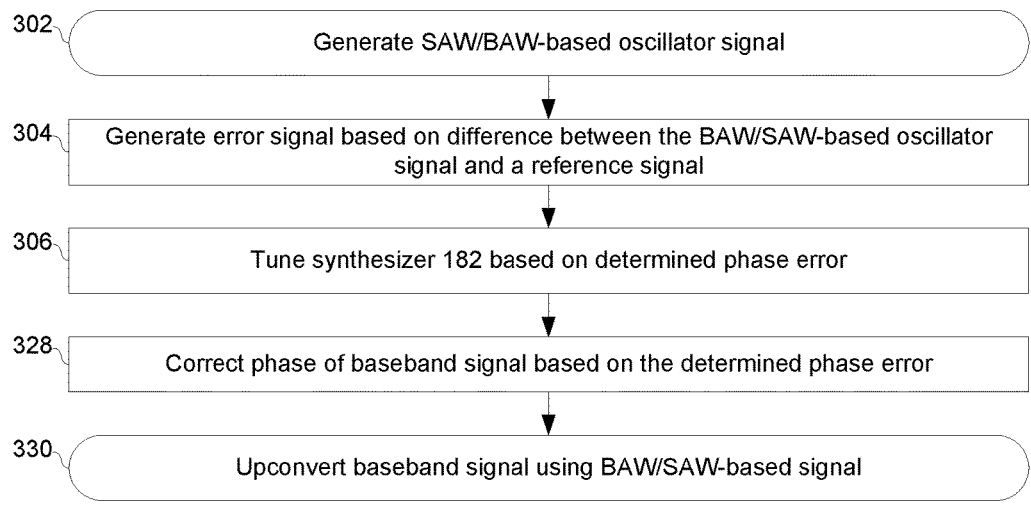
FIG. 3B is a flowchart illustrating an example process for low-phase-noise transmission by a microwave backhaul transceiver.

FIG. 3B is a flowchart illustrating an example process for low-phase-noise transmission by a microwave backhaul transceiver.

The process begins with block 302 in which SAW OR BAW-based oscillator signal 183 is generated by synthesizer 182 based on the output 181 of resonator 180 which may be a bulk acoustic wave (BAW) or surface acoustic wave (SAW) resonator. An advantage of generating the signal 183 from a BAW or SAW resonator is that BAW or SAW resonators are typically able to achieve much lower phase noise at much higher frequencies than crystal oscillators. A drawback of using a BAW or SAW resonator, however, is that they tend to have a high temperature coefficient (i.e., resonant frequency varies substantially over expected range of operating temperature). Accordingly, aspects of this disclosure provide for compensating for phase and/or frequency drift of the SAW OR BAW resonator 180.

In block 304, error signal 185 is generated based on the phase difference between the SAW OR BAW-based oscillator signal 183 and a reference signal (e.g., reference signal 189 in FIG. 1 or reference signal 201 in FIG. 2). Example circuitry for generating the error signal is described below with reference to FIGS. 5A-5C.

In block 306, the synthesizer 182 tunes the frequency of the SAW OR BAW-based oscillator signal 183 based on the error signal 185 generated in block 304.

In block 328, the digital transmit circuitry 154 (pre) corrects the phase of the baseband signal using the signal error signal 185 generated in block 304. Example circuitry for performing that phase correction is described below with reference to FIG. 4.

In block 330, the phase-corrected signal is processed by transmit AFE 158 where it is upconverted using the SAW OR BAW based oscillator signal 183.

Figure 4:
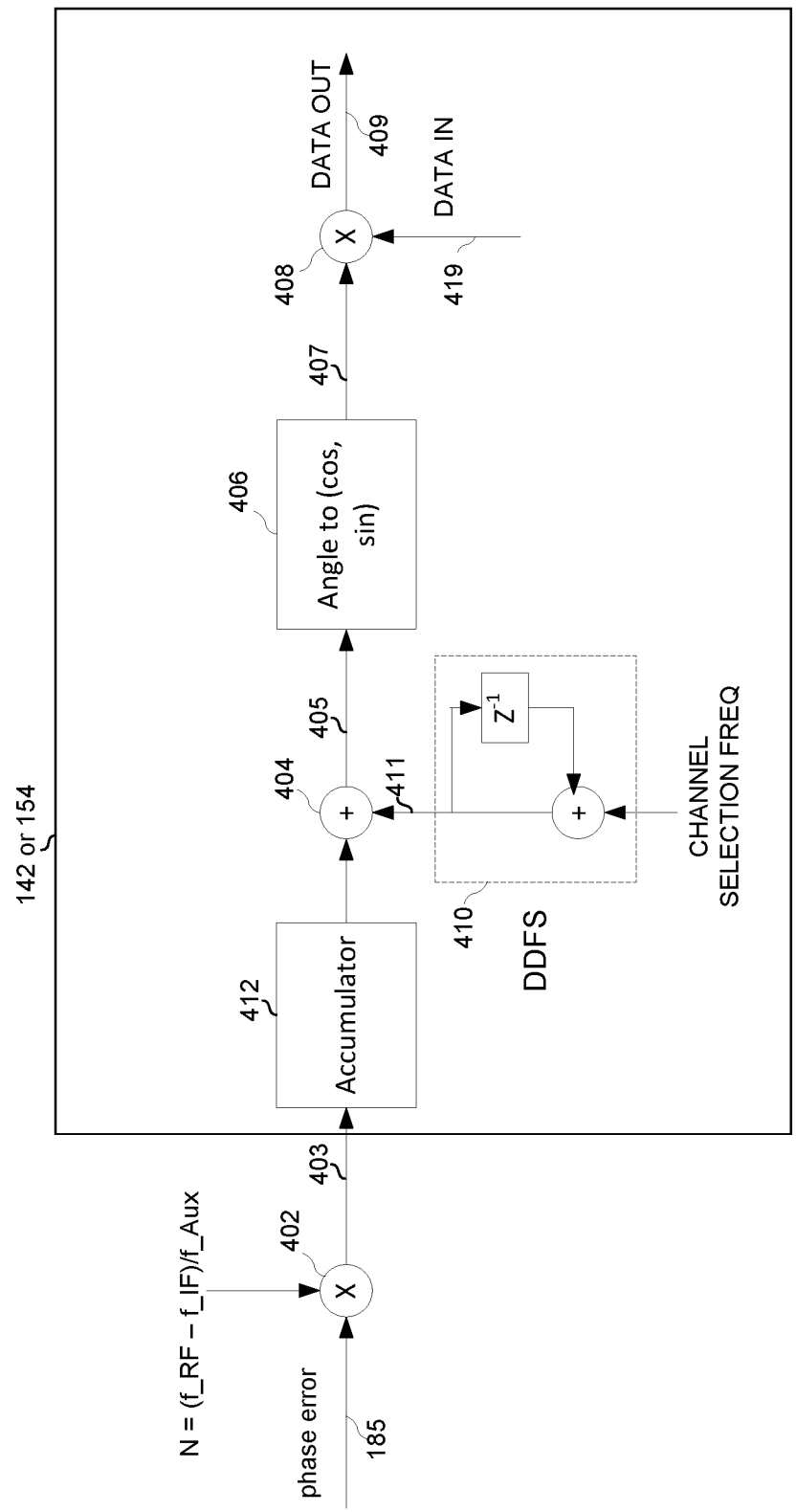
FIG. 4 shows an example implementation of a portion of the transmit and receive digital paths of FIGS. 1 and 2.

FIG. 4 shows an example implementation of a portion of the transmit and receive digital circuitry of FIGS. 1 and 2. The phase error signal 185 from the auxiliary PLL 184 is multiplied, in multiplier circuit 402, by N (e.g., provided by controller 104), where:

N=(f_RF−f_IF)/f_Aux, when DPLL sampling rate and accumulator sampling rate are the same;

N=(f_RF−f_IF)/f_Aux×(sampling rate of DPLL/sampling_rate of accumulator), when DPLL sampling rate and accumulator sampling rate are not the same f_RF is the frequency of signal 183;

f_IF is the frequency of transmit and/or receive signal at interface 122a; and f_Aux is the frequency of the reference signal 189 (FIG. 1) or 201 (FIG. 2).

The resulting signal 403 is accumulated in accumulator 412 and then added, by summer 404, to signal 411 generated by direct digital frequency synthesizer 410. The frequency of signal 411 is the frequency of the microwave channel to be downconverted (for receive) or upconverted to (for transmit). Signal 405, representing a phase angle, θ, is then processed by circuit 406 which outputs cos(θ)+j*sin(θ) as signal 407. Signal 407 is then multiplied by the baseband signal 419 to generate phase corrected signal 409.

Figure 5A:
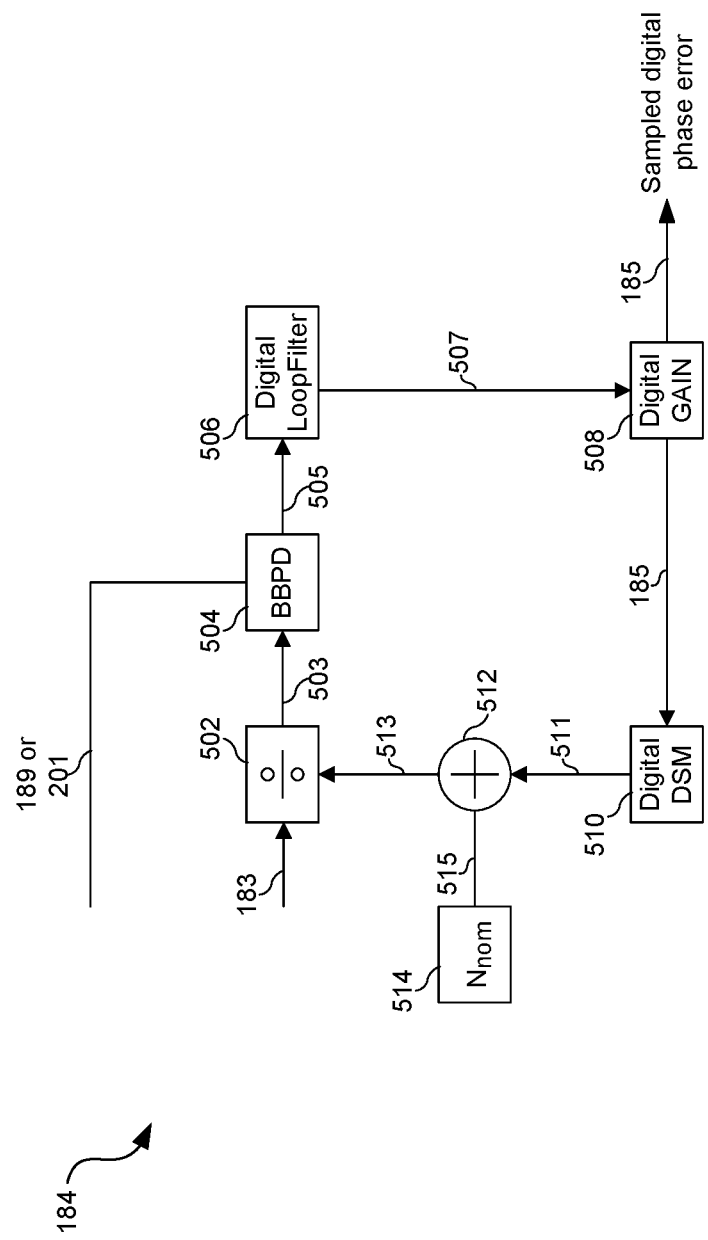
FIGS. 5A-5D show example implementations of the auxiliary reference PLL of FIGS. 1 and 2.

FIG. 5A shows a first example implementation of the auxiliary PLL of FIGS. 1 and 2. Divider 502 divides the SAW OR BAW-based oscillator signal 183 by a ratio 513 to generate signal 503. Bang bang phase detector 504 determines the phase difference between signal 503 and the reference signal 189 (FIG. 1) or 201 (FIG. 2) and outputs the phase difference as signal 505. Signal 505, a digital signal, is filtered by loop filter 506 resulting in signal 507. A gain is applied to signal 507 resulting in the error signal 185. Signal 185 is output from the aux PLL 184 and is fed back to digital delta-sigma modulator (DSM) 510. DSM 510 generates signal 511 which is summed with a nominal value of N (FIG. 4) to generate the divider ratio 513.

Figure 5B:
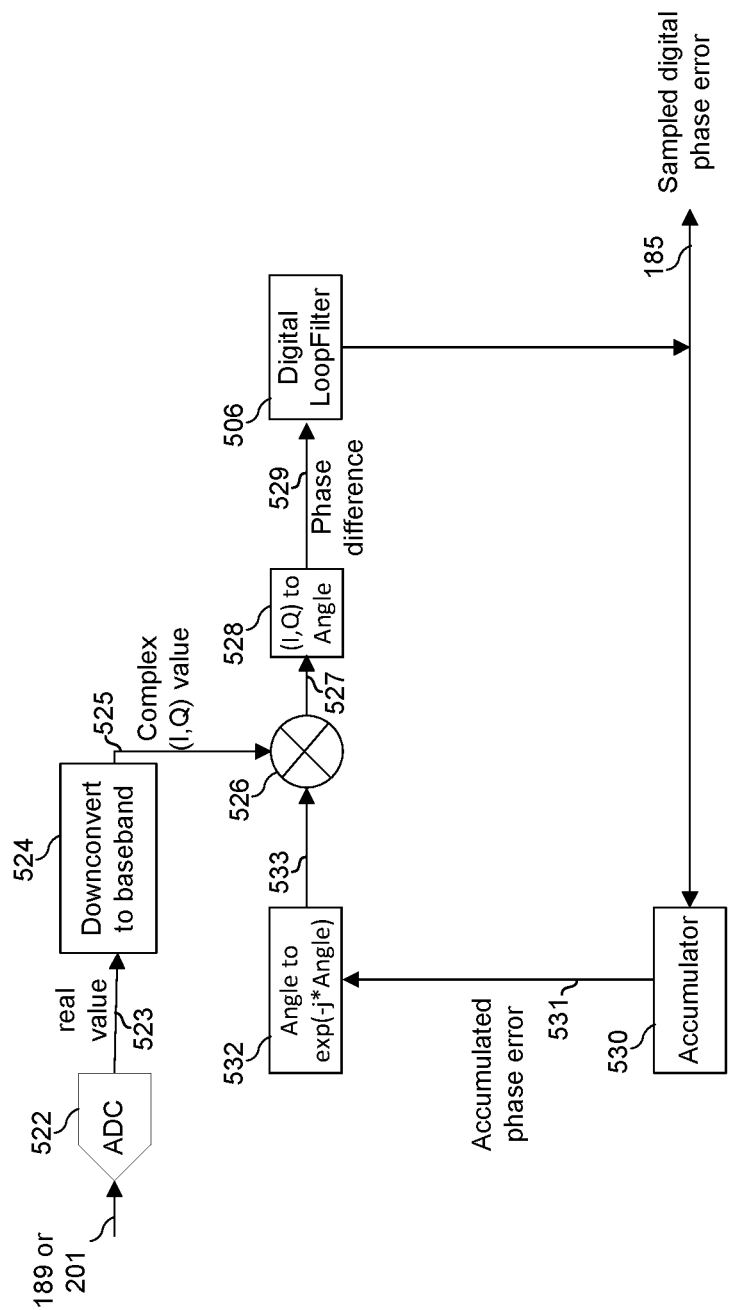

FIG. 5B shows a second example implementation of the auxiliary PLL of FIGS. 1 and 2. ADC 522 digitizes the reference signal 189 (FIG. 1) or 201 (FIG. 2) to generate signal 523, which may be a real valued signal. Signal 523 is downconverted to baseband signal 525 by circuit 524. Baseband signal 525 may be a complex valued signal represented by in-phase and quadrature-phase components. Mixer 526 mixes signal 525 with signal 533 to generate signal 527, which may be a complex valued signal represented by in-phase and quadrature-phase components. Circuit 528 converts the I,Q representation to an angle value 529 representing the phase difference between signals 525 and 533. The angle value 529 is filtered by loop filter 506 to generate signal 185, which is accumulated by accumulator 530 to generate signal 531. Circuit 532 converts the angle value 531 to the in-phase and quadrature-phase components of signal 533.

Figure 5C:
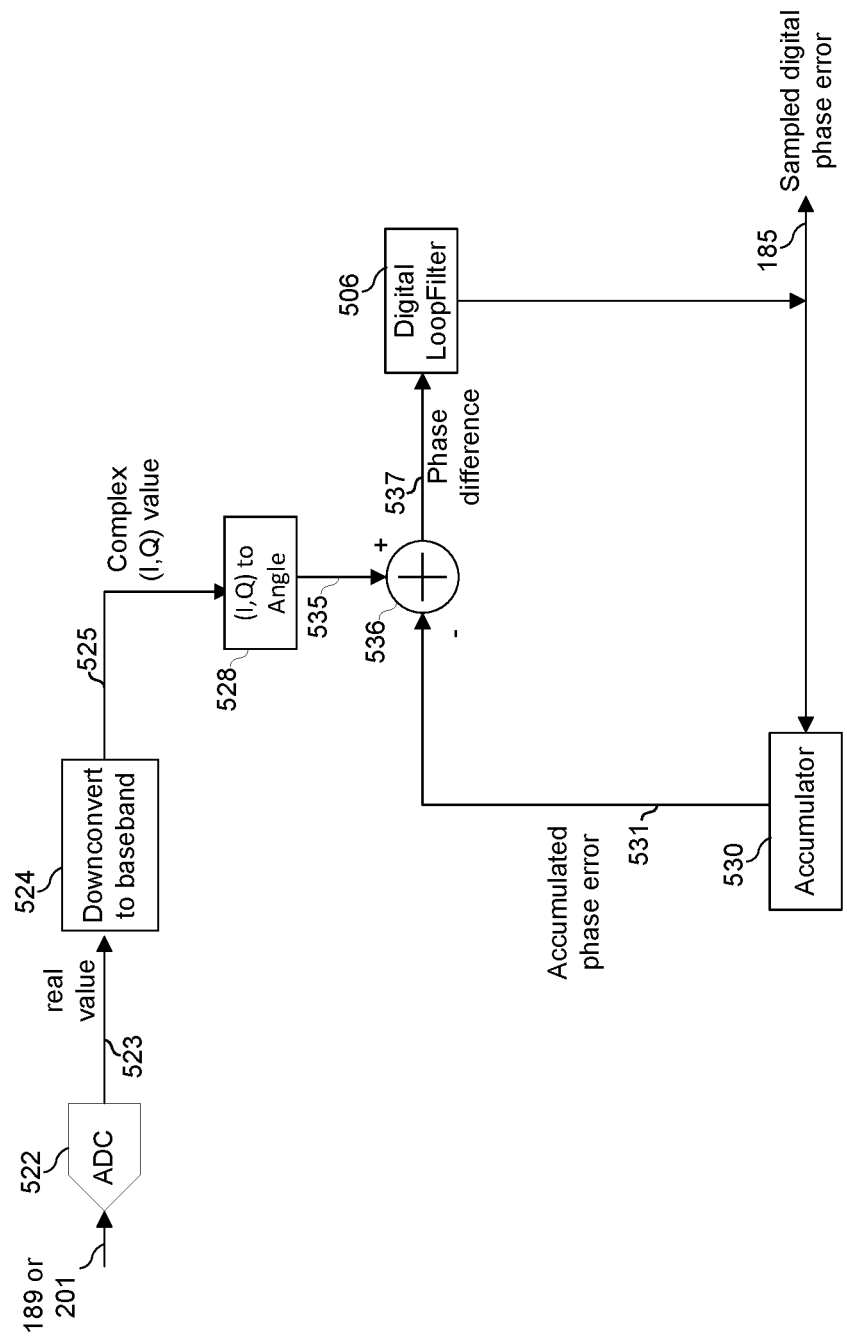

FIG. 5C shows a third example implementation of the auxiliary PLL of FIGS. 1 and 2. ADC 522 digitizes the reference signal 189 (FIG. 1) or 201 (FIG. 2) to generate signal 523, which may be a real valued signal. Signal 523 is downconverted to baseband signal 525 by circuit 524. Baseband signal 525 may be a complex valued signal represented by in-phase and quadrature-phase components. Circuit 528 converts the I,Q representation to an angle value 535. The combiner 536 outputs the difference between the angle 535 and the signal 531 as signal 537. The signal 537 is filtered by loop filter 506 to generate signal 185, which is accumulated by accumulator 530 to generate signal 531.

Figure 5D:
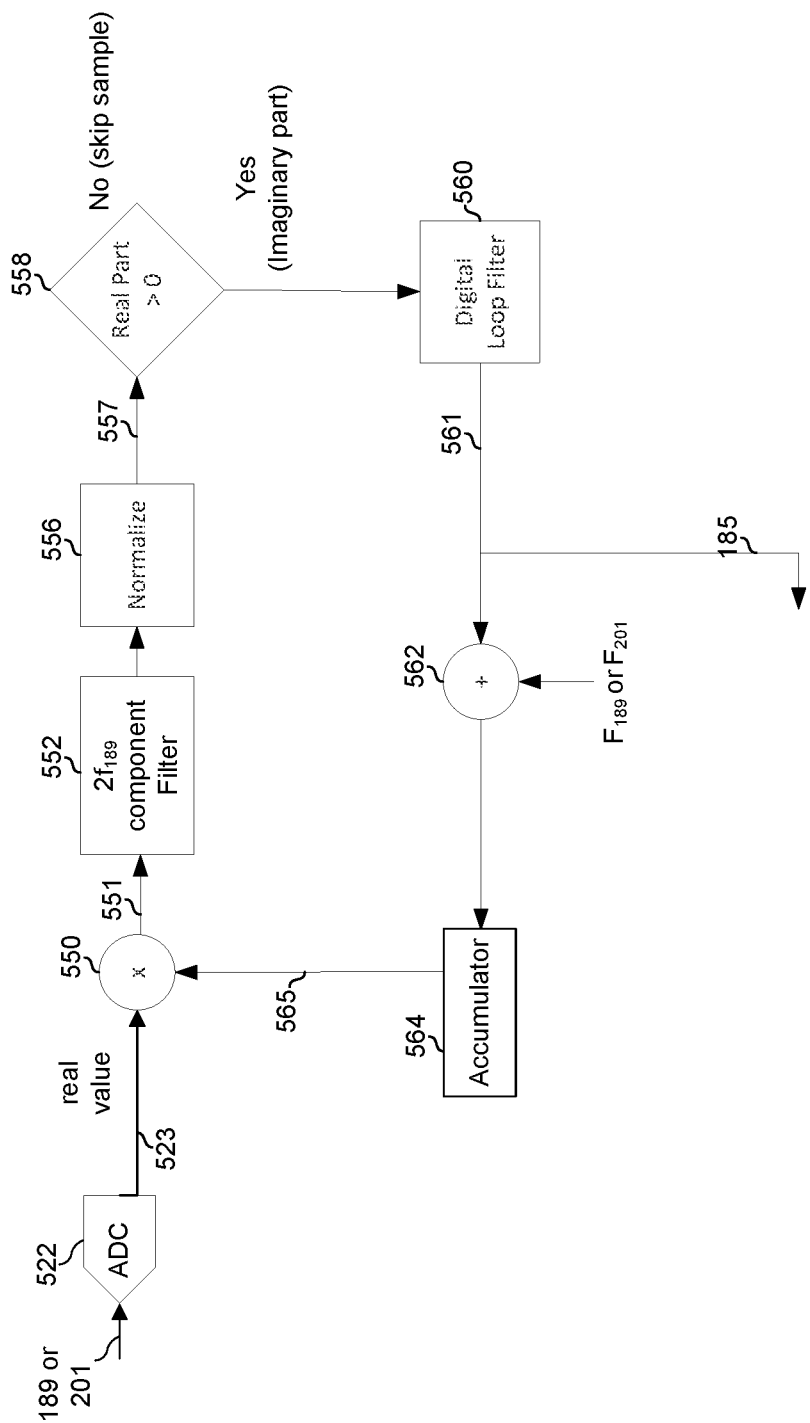
Figure 6:
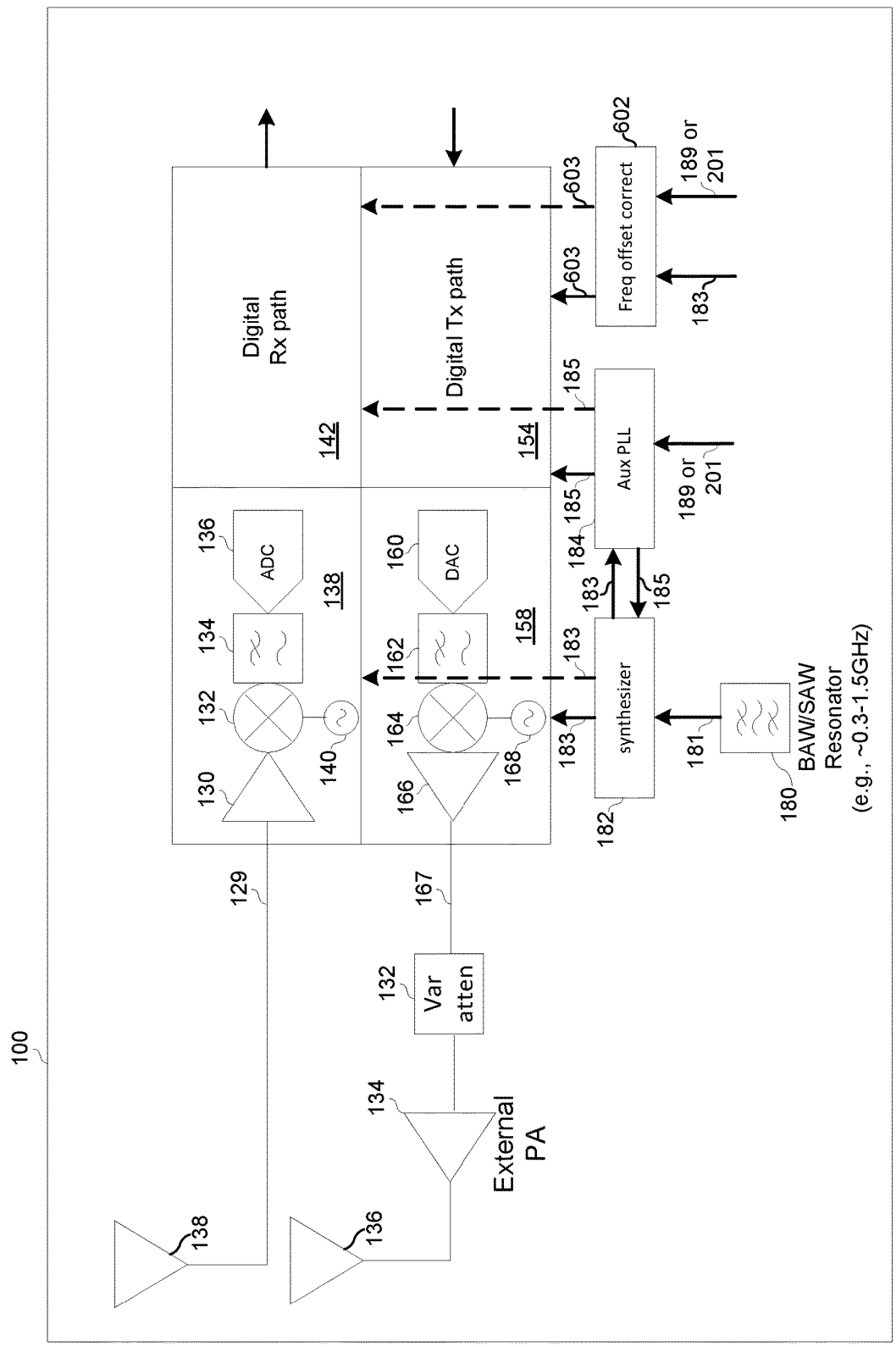
FIG. 6 shows a portion of an example microwave backhaul receiver, in accordance with aspects of this disclosure.

FIG. 5D shows a fourth example implementation of the auxiliary PLL of FIGS. 1 and 2. Mixer 550 mixes signal 523, which is the real component of a digitized version of the reference signal 189 (FIG. 1) or 201 (FIG. 2), with signal 565 to generate signal 551, which is filtered by filter 552 and then normalized by circuit 556 to generate signal 557. The filter 552 is, for example, a narrowband notch filter centered at $2 \times f_{189}$. Circuit 558 analyzes signal 557 to determine if the real part of signal 557 is greater than zero. If not, this sample is skipped. If so, then the imaginary part of signal 557 is conveyed to loop filter 560. Adder 562 adds signal 561 output of loop filter 560 to the value $F_{189}$ (FIG. 1) or $F_{201}$ (FIG. 2), where $F_{189}$ is the frequency of signal 189, and $F_{201}$ is the frequency of signal 201. The output of adder 562 is input to phase error accumulator 564 which outputs the accumulated phase error as signal 565. Signal 561 output of loop filter 560 is also conveyed to divider 566 which divides it by a divide ratio, which may be fixed or variable. The output of divider 566 is input to phase error accumulator 568 which outputs the accumulated phase error as signal FIG. 6 shows a portion of an example microwave backhaul receiver, in accordance with aspects of this disclosure. The depicted portion of the microwave transceiver 100 is similar to those described above but comprises frequency offset correction circuitry 602. Portions of microwave transceiver 100 not shown in FIG. 6 may be as shown in any of FIGS. 1A, 1B, 2A, 2B, and 2C.

The frequency offset correction circuitry 602 is operable to determine a frequency offset between the signal 183 on the one hand and the signal 189 or 201 on the other hand. In an example implementation, the frequency offset correction circuitry 602 is operable to count the number of periods of the signal 183 occurring within a determined number of cycles of the signal 189 or 201. The count may then be used to calculate the frequency offset ppm using the expression $(C_{183}-E_{183})/E_{183} \times 1e6$ ppm where $C_{183}$ is the counted number of clock cycles of 183 and $E_{183}$ is the expected number of clock cycles of signal 183. The frequency offset ppm may be calculated by frequency offset circuitry 602 and provided to digital transmit circuitry 154 and digital receive circuitry 142 as signal 603.

The digital receive circuitry 142 and the digital transmit circuitry 154 are operable to receive the frequency offset 603 and use it to estimate the phase error of the signal 181.

In an example implementation (e.g., where the microwave transceiver 100 is required to receive only a single polarization of a single-input-output signal), the determined frequency offset 603 may be sufficient for the digital receive circuitry 142 and the digital transmit circuitry 154 to estimate and correct at least part of the phase error. Remaining phase error can be corrected in modem 124.

In another example implementation (e.g., where the microwave transceiver 100 is required to receive multiple polarizations and/or a multiple-input-multiple-output signal), the determined frequency offset 603 may be insufficient for the digital receive circuitry 142 and the digital transmit circuitry 154 to obtain a sufficiently accurate estimate of the phase error of the signal 181. Accordingly, the frequency offset may be used to initially reduce the phase error (e.g., from on the order of 1000 ppm to on the order of 100 ppm) and then frequency correction may be frozen and then the Aux PLL 189 or 201 may be used as described above to phase lock the frequency corrected signal to the reference signal 189 or 201.

In accordance with an example implementation of this disclosure, a system comprises a microwave backhaul outdoor unit (e.g., 100) comprises a first resonant circuit (e.g., 180), phase error determination circuitry (e.g., 184), and phase error compensation circuitry (e.g., 182, 142, and/or 154). The first resonant circuit is operable to generate a first signal (e.g., 181) characterized by a first amount of phase noise and a first amount of temperature stability. The phase error determination circuitry is operable to generate a phase error signal (e.g., 185) indicative of phase error between the first signal and a second signal (e.g., 189) characterized by a second amount of phase noise that is greater than the first amount of phase noise, and a second amount of temperature instability that is less than the first amount of temperature instability. The phase error compensation circuitry is operable to adjust the phase of a data signal (e.g., 409) based on the phase error signal, the adjustment resulting in a phase compensated signal (e.g., 409). The microwave backhaul outdoor unit may comprise interface circuitry (e.g., 122a) operable to receive the second signal from a microwave backhaul indoor unit (e.g., 120). The microwave backhaul outdoor unit may comprise a second resonant circuit (e.g., 188) operable to generate the second signal. The first resonant circuit may be a surface acoustic wave resonator or a bulk acoustic wave resonator, and the second resonant circuit may be a crystal oscillator. The microwave backhaul outdoor unit may comprise local oscillator generation circuitry (e.g., 182, 168, and/or 140) operable to generate a local oscillator signal (e.g., output of 140) based on the first signal, and analog front end circuitry (e.g., 138) operable to process a received signal (e.g., 129) to generate the data signal, wherein the generation of the data signal comprises mixing (e.g., by mixer 132) of the received signal with the local oscillator signal. The microwave backhaul outdoor unit may comprise local oscillator generation circuitry (e.g., 182, 168, and/or 140) operable to generate a local oscillator signal (e.g., output of 168) based on the first signal, and analog front end circuitry (e.g., 158) operable to process the data signal to generate an RF signal (e.g., 167) for transmission, wherein the generation of the RF signal comprises mixing (e.g., by mixer 164) of the data signal with the local oscillator signal. The phase error determination circuitry comprises frequency divider circuitry (e.g., 502) operable to divide a reference signal (e.g., 183) generated based on the first signal by a determined ratio to generate a third signal (e.g., 503), and signal processing circuitry (e.g., 504, 506 and 508) operable to generate the phase error signal based on a phase difference between the third signal and the second signal. The phase error determination circuitry may comprise a delta sigma modulator (e.g., 511) operable to control the determined ratio based on the phase error signal. The phase error compensation circuitry may comprise: multiplier circuitry (e.g., 402) operable to multiple a frequency of the phase error signal by a determined ratio to generate a fourth signal (e.g., 403); frequency synthesizer circuitry (e.g., 410) operable to generate a fifth signal (e.g., 411) at a selected frequency; and summer circuitry (e.g., 404) operable to sum the fourth signal and the fifth signal to generate a sixth signal (e.g., 405). The determined ratio may be the ratio of the frequency of a reference signal (e.g., 183) generated based on the first signal to the frequency of the second signal. The phase compensation circuitry may comprise a phase locked loop. The microwave backhaul outdoor unit may comprise interface circuitry (e.g., 122a) operable to transmit the phase compensated signal (e.g., 409) to a microwave backhaul indoor unit (e.g., 120). The interface circuitry may be operable to upconvert the phase compensated signal prior to the transmission (e.g., over coaxial cable or fiber optic cable 144) to the microwave backhaul indoor unit. The system may comprise a microwave backhaul indoor unit (e.g., 120) operable to receive the phase compensated signal from the microwave backhaul outdoor unit. The microwave backhaul outdoor unit may comprise frequency synthesizer circuitry (e.g., 182, 168, and/or 140) operable to generate a reference signal (e.g., 183) based on the first signal. The frequency synthesizer circuitry may be operable to compensate a phase of the reference signal based on the phase error signal, the compensation resulting in a phase compensated reference signal (e.g., 183). The frequency synthesizer circuitry may be operable to generate a microwave frequency local oscillator signal based on the phase compensated reference signal.

In accordance with an example implementation of this disclosure, a system comprises a microwave backhaul outdoor unit comprising: a surface acoustic wave or bulk acoustic wave resonator (e.g., 180) operable to generator a first reference signal (e.g., 181); frequency synthesizer circuitry (e.g., 182, 168, and/or 140) operable to generate a microwave frequency local oscillator signal (e.g., output of 168 or 140) based on the first reference signal; crystal oscillator circuitry (e.g., 188) operable to generate a second reference signal (e.g., 189); phase error determination circuitry (e.g., 184) operable to generate a signal indicative of a phase error between the first reference signal and the second reference signal; and phase error compensation circuitry (e.g., 142, 154, and/or 182) operable to adjust the phase of a signal (e.g., 409 or 183) based on the signal indicative of the phase error.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A system comprising:
   a local oscillator operable to generate a local oscillator signal comprising a phase distortion, wherein the local oscillator signal is characterized by a first phase noise and a first temperature instability; and
   phase error compensation circuitry operable to:
   determine a phase error of the local oscillator signal based on a reference signal, wherein the reference signal is characterized by a second phase noise that is greater than said first phase noise, and wherein the reference signal is characterized by a second temperature instability that is less than said first temperature instability; and
   adapt the phase distortion of the local oscillator signal based on the determined phase error to generate a phase compensated signal.

2. The system of claim 1, wherein the system comprises an interface operable to receive the reference signal from a microwave backhaul unit.

3. The system of claim 1, wherein the system comprises a second local oscillator operable to generate the reference signal.

4. The system of claim 1, wherein the local oscillator is a surface acoustic wave resonator.

5. The system of claim 1, wherein the local oscillator is a bulk acoustic wave resonator.

6. The system of claim 1, wherein the local oscillator is a crystal oscillator.

7. The system of claim 1, wherein the system is operable to process a received signal according to the local oscillator signal.

8. The system of claim 1, wherein the system is operable to process a signal for transmission according to the local oscillator signal.

9. The system of claim 1, wherein the phase error compensation circuitry comprises:
   a frequency synthesizer operable to generate a first signal based on the local oscillator signal;
   frequency divider circuitry operable to divide the first signal by a determined ratio to generate a second signal; and
   signal processing circuitry operable to generate the phase error based on a phase difference between the reference signal and the second signal.

10. The system of claim 9, wherein the phase error compensation circuitry comprises a delta sigma modulator operable to control the determined ratio based on the phase error.

11. The system of claim 1, wherein the phase error compensation circuitry comprises:
   multiplier circuitry operable to multiply a frequency of the phase error signal by a determined ratio to generate a first signal;
   frequency synthesizer circuitry operable to generate a second signal at a selected frequency; and
   summer circuitry operable to sum the first signal and the second signal to generate a fifth signal.

12. The system of claim 11, wherein the determined ratio is the ratio of the frequency of the local oscillator signal to the frequency of the reference signal.

13. The system of claim 1, wherein phase error compensation circuitry comprises a phase locked loop.

14. The system of claim 1, wherein the phase error compensation circuitry is operable to upconvert the phase compensated signal prior to a data transmission.

15. The system of claim 1, wherein the phase compensated signal is transmitted over a coaxial cable.

16. The system of claim 1, wherein the reference signal is a second phase compensated signal received from a microwave backhaul unit.

17. The system of claim 16, wherein the system is communicatively coupled to the microwave backhaul unit via a coaxial cable.

18. The system of claim 1, wherein the system comprises a frequency synthesizer operable to generate the reference signal based on the local oscillator signal.

19. The system of claim 1, wherein a frequency synthesizer is operable to adjust a phase of the reference signal based on the phase error to generate a phase compensated reference signal.

20. The system of claim 19, wherein the frequency synthesizer is operable to generate a microwave frequency local oscillator signal based on the phase compensated reference signal.

* * * * *